US011403352B2

(12) United States Patent
Paris et al.

(10) Patent No.: US 11,403,352 B2
(45) Date of Patent: Aug. 2, 2022

(54) MULTI-TOUCH GESTURE SEARCH

(71) Applicant: Oath Inc., New York, NY (US)

(72) Inventors: Jonathan Paris, Palo Alto, CA (US); Leili Baghaei Rad, Menlo Park, CA (US); Benoit Schillings, Los Altos Hills, VA (US); Yuhuan Tang, Santa Clara, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 16/139,298

(22) Filed: Sep. 24, 2018

(65) Prior Publication Data

US 2019/0026377 A1    Jan. 24, 2019

Related U.S. Application Data

(63) Continuation of application No. 14/867,695, filed on Sep. 28, 2015, now Pat. No. 10,083,238.

(51) Int. Cl.
*G06F 16/9535* (2019.01)
*G06F 3/04883* (2022.01)
*G06F 3/04842* (2022.01)
*G06F 3/0482* (2013.01)
*G06F 16/432* (2019.01)

(52) U.S. Cl.
CPC ........ *G06F 16/9535* (2019.01); *G06F 3/0482* (2013.01); *G06F 3/04842* (2013.01); *G06F 3/04883* (2013.01); *G06F 16/434* (2019.01); *G06F 2203/04803* (2013.01); *G06F 2203/04808* (2013.01)

(58) Field of Classification Search
CPC .......... G06F 16/9535; G06F 33/04883; G06F 16/434; G06F 3/0482; G06F 3/04842; G06F 3/04883; G06F 2203/04803; G06F 2203/04808
See application file for complete search history.

(56) References Cited

U.S. PATENT DOCUMENTS

| 7,831,609 B1 * | 11/2010 | Alexander | G06F 16/9566 |
| | | | 707/765 |
| 2007/0130126 A1 * | 6/2007 | Lucovsky | G06Q 30/02 |
| 2008/0275869 A1 * | 11/2008 | Herberger | G06Q 10/00 |
| 2009/0058820 A1 * | 3/2009 | Hinckley | G06F 3/04883 |
| | | | 345/173 |

(Continued)

*Primary Examiner* — Daniel Samwel
(74) *Attorney, Agent, or Firm* — Cooper Legal Group LLC

(57) ABSTRACT

One or more systems and/or methods for providing related content associated with a multi-touch gesture to a user are provided. A multi-touch gesture (e.g., a pinch-in gesture, a pinch-out gesture, etc.) may be received through a user interface of a client device (e.g., smartphone, tablet, television, virtual wall, etc.) associated with a user. The multi-touch gesture may be evaluated to identify an area of interest of the user interface (e.g., a portion of user interface containing content of interest to the user). The area of interest may be evaluated to identify context (e.g., keywords, phrases, associated content, etc.) associated with the area of interest. A search of content may be performed based upon the context to identify related content (e.g., news articles, wide-area network search results, local device search results, etc.) associated with the context. The related content may be provided to the user through the client device.

20 Claims, 14 Drawing Sheets

(56) References Cited

U.S. PATENT DOCUMENTS

| | | | |
|---|---|---|---|
| 2009/0063448 A1* | 3/2009 | DePue | G06Q 10/10 |
| 2009/0181651 A1* | 7/2009 | Klassen | H04W 4/12 455/414.1 |
| 2012/0166450 A1* | 6/2012 | Choi | G06F 16/24534 707/748 |
| 2012/0203764 A1* | 8/2012 | Wood | G06F 16/5866 707/722 |
| 2012/0294520 A1* | 11/2012 | Mei | G06K 9/00335 382/164 |
| 2013/0006957 A1* | 1/2013 | Huang | G06F 3/017 707/706 |
| 2013/0106685 A1* | 5/2013 | Davis | G06F 16/00 345/156 |
| 2013/0298162 A1* | 11/2013 | Cho | H04N 21/23418 725/43 |
| 2014/0052751 A1* | 2/2014 | Zhang | G06F 16/9577 707/769 |
| 2014/0188862 A1* | 7/2014 | Campbell | G06F 16/248 707/728 |
| 2014/0201126 A1* | 7/2014 | Zadeh | A61B 5/165 706/52 |
| 2014/0250120 A1* | 9/2014 | Mei | G06F 3/0488 707/736 |
| 2014/0253472 A1* | 9/2014 | Ayoub | H04N 21/4722 345/173 |
| 2015/0052431 A1* | 2/2015 | Zhu | G06K 9/00671 715/716 |
| 2015/0169067 A1* | 6/2015 | Hong | G06F 16/9032 715/863 |
| 2015/0227795 A1* | 8/2015 | Starner | G06F 16/583 345/156 |
| 2015/0317569 A1* | 11/2015 | Renaudie | G06Q 10/02 705/5 |
| 2015/0378591 A1* | 12/2015 | Yang | G06F 16/43 715/863 |
| 2016/0196284 A1* | 7/2016 | Kanda | H04N 5/23293 707/724 |
| 2016/0203360 A1* | 7/2016 | Alvarez | G06F 3/04845 345/156 |
| 2017/0300495 A1* | 10/2017 | Sharifi | G06F 16/90335 |

* cited by examiner

MULTI-TOUCH GESTURE SEARCH

CROSS REFERENCE TO RELATED APPLICATION

This application claims priority to and is a continuation of U.S. application Ser. No. 14/867,695, filed on Sep. 28, 2015, entitled "MULTI-TOUCH GESTURE SEARCH", which is incorporated herein.

BACKGROUND

Many users may interact with content (e.g., a news article, a social media post, multimedia files, etc.) through computing devices (e.g., smartphones, tablets, augmented reality devices, etc.) on a regular basis. In an example, a user may read an electronic book on a tablet. In another example, the user may search for local restaurants that serve takeout food by reading reviews for the local restaurants. However, users may come across content which they do not understand and/or want to know more about. Thus, users may want to locate additional content related to the content currently being viewed (e.g., an article about a new movie may spark an interest about an actor in the new movie, a local restaurant review for a local deli may make the user want to travel to the local deli, etc.). However, in order to locate additional content, users may be required to exit a first user interface (e.g., a news application) currently displaying the content (e.g., a news article) and perform a search in a second user interface (e.g., a search application) based upon the user's recollection of the content from the first user interface. As a result, users may waste time transitioning back-and-forth between the first user interface and the second user interface. Moreover, users may forget/neglect to search for relevant portions of the content and/or properly define search parameters for the search, which may result in a number of irrelevant search results being presented to users. Unfortunately, many computing devices may lack technology that can efficiently and effectively identify related content, which may result in a decrease in the user's experience with the computing device, an inefficient utilization of computing resources, and/or an inefficient utilization of users time (e.g., users may become frustrated with having to view/sort through a large number of irrelevant search results, etc.).

SUMMARY

In accordance with the present disclosure, one or more systems and/or methods for providing related content associated with a multi-touch gesture to a user are provided. A multi-touch gesture may be received through a user interface of a client device (e.g., smartphone, tablet, television, virtual wall, etc.) associated with a user. In an example, the client device may comprise a touchscreen configured to display the user interface and the multi-touch gesture may comprise a pinch-in gesture or a pinch-out gesture. The multi-touch gesture may be evaluated to identify an area of interest of the user interface. The area of interest may comprise content (e.g., text, images, etc.) displayed within a portion of the user interface corresponding to the area of interest. The area of interest may be evaluated to identify context associated with the area of interest (e.g., sports, gardening, banking, etc.). The context may be determined based upon a keyword from the area of interest and a contextual meaning determined for the keyword based upon the content of the area of interest. A search of content may be performed based upon the context to identify related content (e.g., news articles, wide-area network search results, local device search results, etc.) associated with the context. The related content may be provided through the client device. In an example, the related content may be displayed through a second user interface, such as a search assistant user interface. The second user interface may be configured to display the related content as search results corresponding to the related content (e.g., previews and/or links corresponding to the related content).

In an example, a visual effect (e.g., fade effect, blackout effect, etc.) may be utilized to indicate the area of interest identified based upon the multi-touch gesture received from the user. Feedback associated with the identification of the area of interest may be received from the user based upon the visual effect. Responsive to the feedback indicating an improper identification for the area of interest (e.g., too large of an area selected, too small an area selected, etc.), the area of interest may be adjusted. In an example, a second multi-touch gesture may be received and utilized to adjust the area of interest.

In an example, responsive to providing the related content items to the user, a secondary input may be received from the user. For example, a set of potentially relevant keyword may be provided to the user. Responsive to the user selecting a potentially relevant keyword from the set of potentially relevant keywords, the potentially relevant keyword may be utilized as the secondary input. In another example, an input box may be displayed through a second user interface. The user may be prompted to enter a keyword and/or phrase into the input box. Responsive to the keyword and/or phrase being entered into the input box, the keyword and/or phrase may be utilized as the secondary input. A second search may be performed utilizing the secondary input. For example, the related content may be filtered based upon the secondary input to obtain a set of filtered related content. In another example, the related content may be expanded based upon the secondary input to obtain a set of expanded related content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
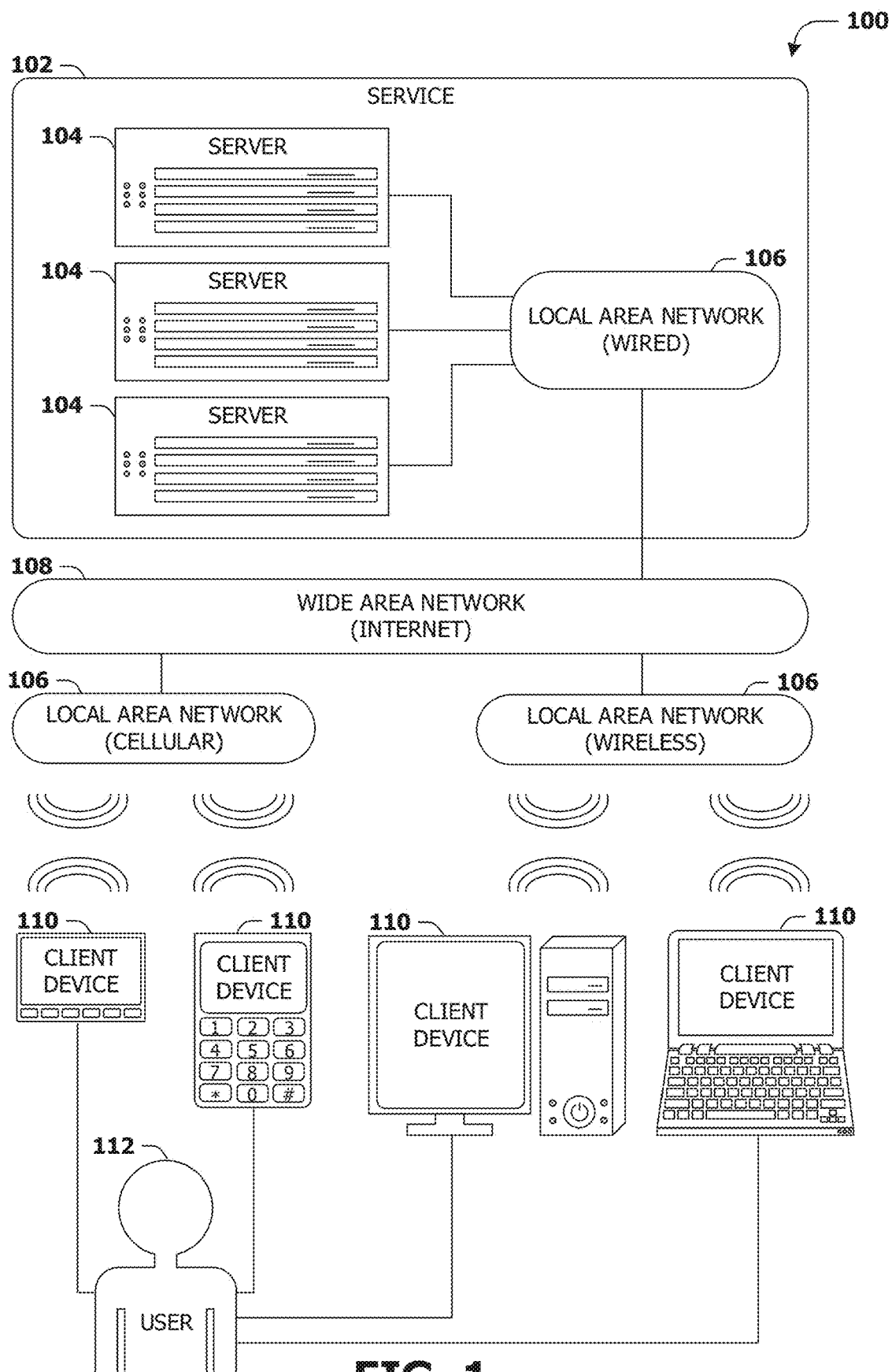
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a Wi-Fi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
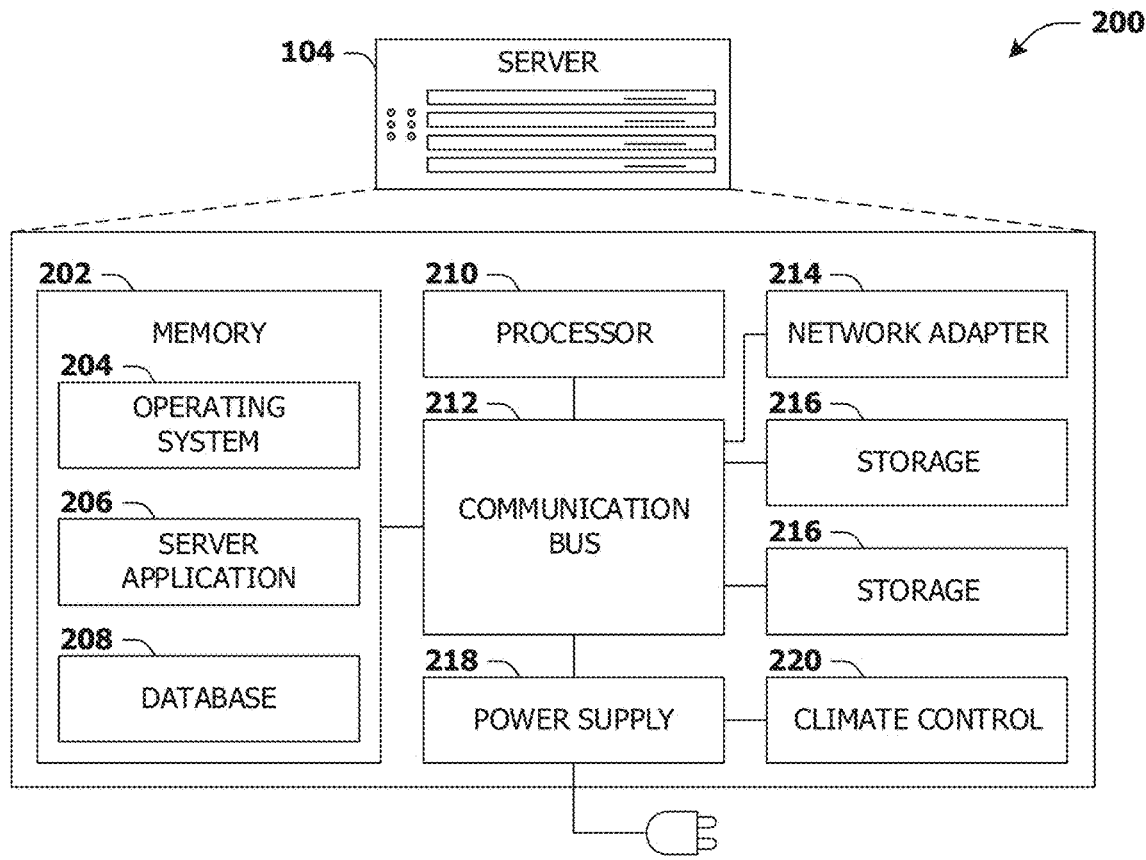
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
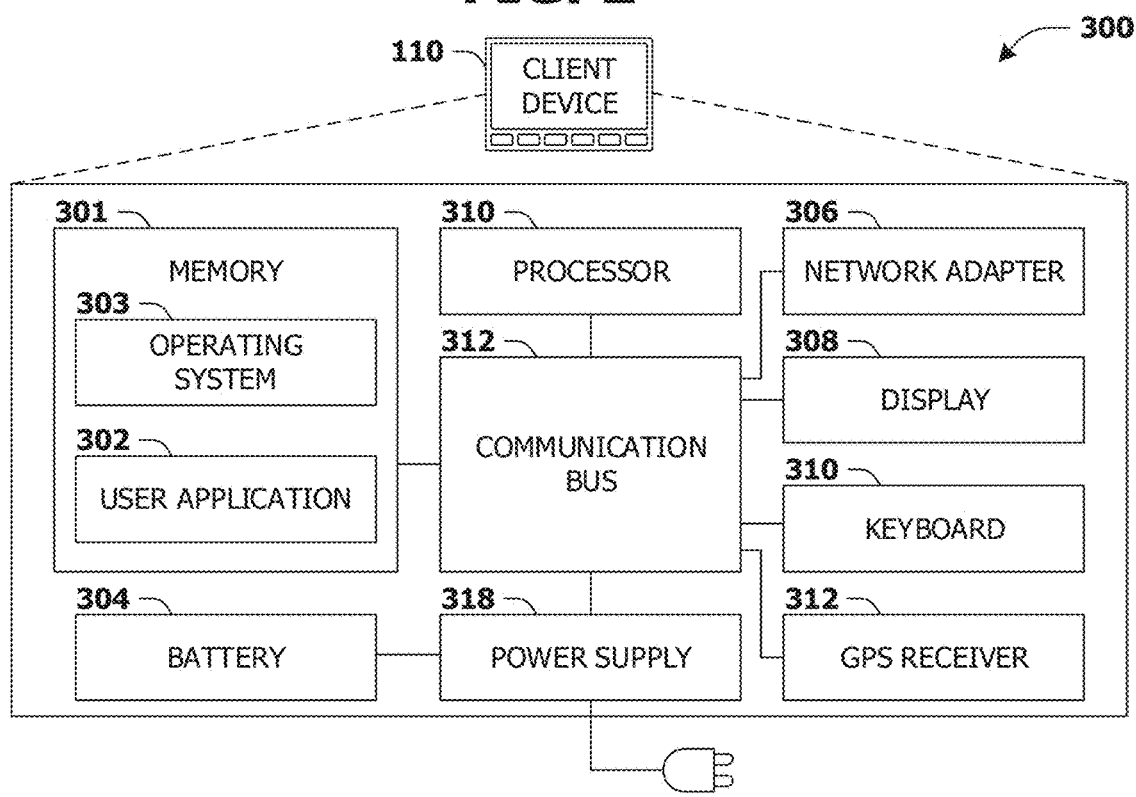
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time)

may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for providing related content associated with a multi-touch gesture to a user are provided. Many devices lack detection techniques and/or functionality for performing a search (e.g., an in-application search) based upon content and/or context identified from a multi-touch gesture. As provided herein, a multi-touch gesture (e.g., a pinch gesture) may be received through a user interface of a client device (e.g., smartphone, tablet, television, virtual wall, etc.) associated with a user. The multi-touch gesture may be evaluated to identify an area of interest of the user interface. The area of interest may be evaluated to identify context associated with the area of interest (e.g., content displayed within the area of interest may be evaluated to determine that the content corresponds to a soccer context). A search of content may be performed based upon the context to identify related content (e.g., news articles, wide-area network search results, local device search results, etc.) associated with the context.

The search for related content may be initiated by the utilization of multi-touch gestures. In this way, users may perform a search without a need to switch between user interfaces to initiate a search (e.g., users do not need to close and/or minimize a first application, displaying content of interest, to launch a second application capable of performing a search for content related to the content of interest). Moreover, the user may not need to remember search terms and/or determine contextual search strings (e.g., users may not have sufficient knowledge to determine the contextual meaning for the keywords within the area of interest). A user's experience with obtaining related content as well as an operating efficiency of the user may be enhanced by performing a search initiated by a multi-touch gesture (e.g., the user may not have to open up multiple applications to locate related content; a search query may be automatically generated based upon the multi-touch gesture, thus possibly returning more relevant related content items; etc.). Accordingly, the operating efficiency, functionality, and/or power consumption of devices may be improved (e.g., lower power consumption by operating less application and/or by performing fewer searches; decreased likelihood user's will incorrectly enter a search query; improved user experience as a results of faster access to search results; etc.).

Figure 4:
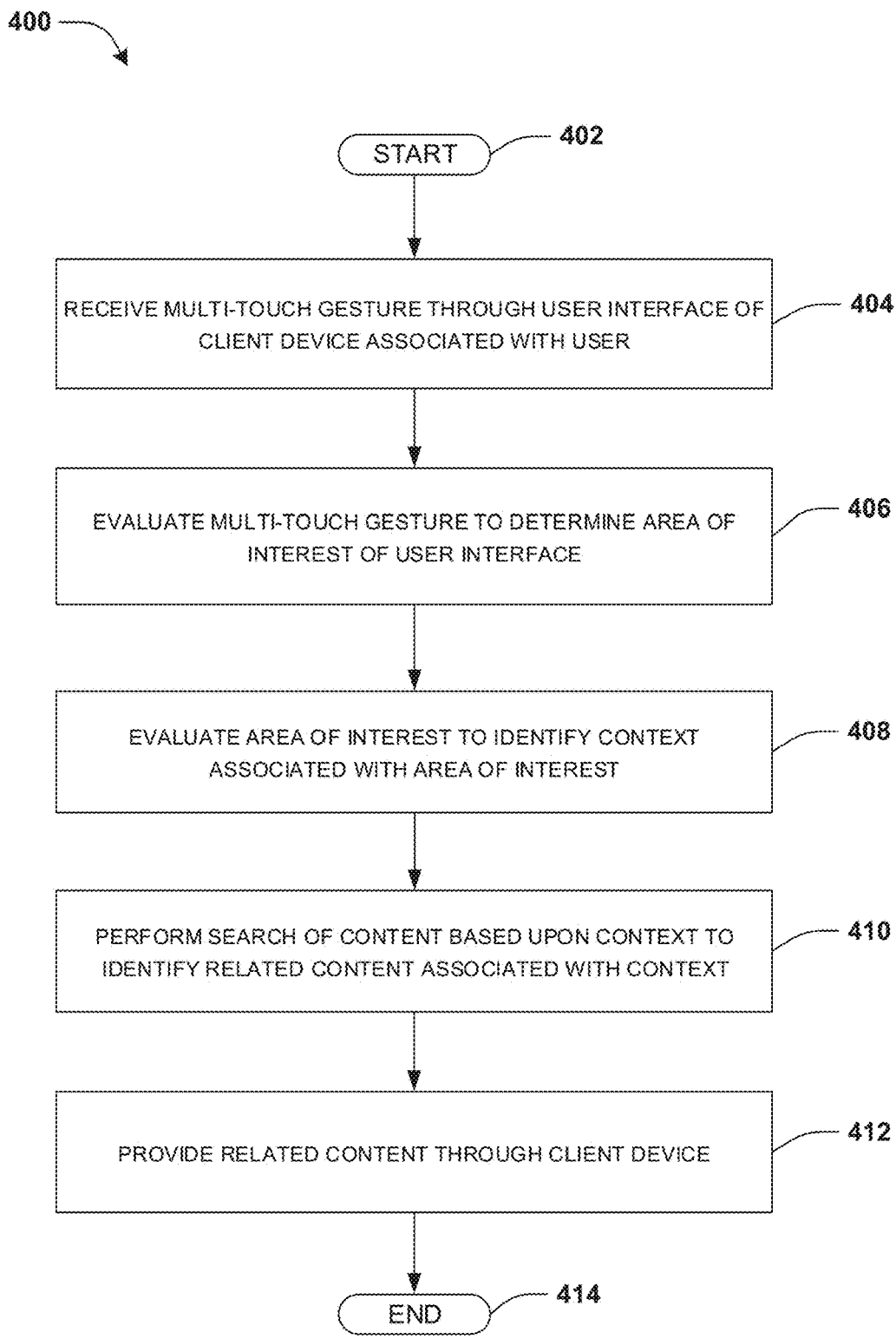
FIG. 4 is a flow chart illustrating an example method of providing related content associated with a multi-touch gesture to a user.

An embodiment of providing related content associated with a multi-touch gesture to a user is illustrated by an example method 400 of FIG. 4. At 402, the method 400 starts. At 404, a multi-touch gesture may be received through a user interface of a client device associated with a user. The client device may comprise a game console (e.g., video game consoles, casino game consoles such as slot machines, video poker consoles, etc.), a personal computer, a laptop, a monitor, a tablet, a smartphone, a smart watch, a personal digital assistant, a global position system (GPS) navigation device, a vehicle information component (e.g., a vehicle display console for accessing other components, such as a navigation system, a DVD player, a radio tuner, etc.), a smart television, a kiosk, a smart board, a smart wall (e.g., multi-touch multi-user smart walls), or the like.

In an example, the multi-touch gesture may be received though a display associated with the client device, such as a touchscreen display or a motion sensing display. The touchscreen display may comprise a resistive touchscreen display (e.g., 5-wire resistive touchscreen), a surface acoustic wave touchscreen display (e.g., touchscreen with a series of piezoelectric transducers and receivers along sides of a display), a capacitive sensing touchscreen display (e.g., an insulator, such as glass coated with a transparent conductor such as indium tin oxide, etc.), a surface capacitance touchscreen display, a projected capacitance touchscreen display, a mutual capacitance touchscreen display, a self-capacitance touchscreen display, an infrared touchscreen display, an optical touchscreen display, or an acoustic pulse touchscreen display. The motion sensing display may comprise an interactive projection display configured to project the user interface onto a surface (e.g., a wall, a floor, a table, a body part, etc.). In an example, the display may comprise a projector (e.g., a pico-projector, an overhead projector, a liquid crystal display projector, etc.) and one or more sensors configured to detect a multi-touch hands-off gesture performed by the user (e.g., a virtual representation of a user interface may be projected directly onto the skin of the user and responsive to the user performing a gesture relative to the virtual representation, a proximity sensor may receive an input corresponding to the gesture). In another example, a range camera having an infrared projector may be utilized to detect multi-touch hands-off gestures performed by the user. For example, the motion sensing display may be configured as a part of an augmented reality display device.

In an example, the multi-touch gesture may comprise gestures performed with two or more fingers and/or with two or more points of simultaneous reference (e.g., the user may perform the multi-touch gesture on the touchscreen display of a smartphone with a thumb and forefinger or the user may perform a hand-off multi-touch gesture relative to a 3D motion sensing display with a right hand and a left hand of the user). For example, the multi-touch gesture may comprise a pinch-in gesture (e.g., a two-finger pinch gesture where the fingers of the user move towards each other, a thumb and three-finger pinch gesture where the thumb progressively moves closer to the other three fingers, etc.), a pinch-out gesture (e.g., a pinch gesture where the thumb and forefinger progressively move further apart from each other, etc.), a rotational gesture (e.g., a gesture where the thumb and forefinger rotate around a particular point), and/or the like.

In an example, responsive to the user performing the multi-touch gesture, gesture data corresponding to the multi-touch gesture may be generated. The gesture data may comprise electrical impulse data and/or coordinate mapping data corresponding to the multi-touch gesture and/or points on the display wherein the multi-touch gesture was performed (e.g., the electrical impulses and/or coordinates may correspond to a location, a shape, a size, a force, etc. of the multi-touch gesture). For example, gesture data may be generated by the touchscreen display in response to the user performing a pinch-in gestures with a thumb and forefinger. The gesture data for the pinch-in gesture may be indicative of content that the user may want to search.

At 406, the multi-touch gesture may be evaluated to determine an area of interest of the user interface. The area of interest may be determined by evaluating one or more characteristics of the gesture, such as a length, points of origination, points of termination, and/or force associated with the multi-touch gesture. In an example, the gesture data for a pinch-in gesture may be evaluated to determine the area of interest (e.g., an area with defined boundaries). For example, an origin point of a thumb and an origin point of a forefinger associated with the pinch-in gesture may be utilized as a first corner and a second corner (e.g., opposing corners) of the area of interest (e.g., a square area). The first corner and the second corner may be utilized to determine a third corner and a forth corner for the area of interest. Virtual boundaries may be extended between the corners to define a portion of the user interface corresponding to the area of interest. In an example, the area of interest may comprise content associated with the area of interest at the time the multi-touch gesture is performed (e.g., the area of interest may include a portion of an article displayed within the boundaries of the area of interest when the user performed the pinch-in gesture).

In an example, a visual effect, indicative of the area of interest identified based upon the multi-touch gesture, may be provided to the user. For example, a secondary area of the user interface, not included in the area of interest, may be distorted (e.g., faded, dimmed, blurred, blacked out, etc.). In this way, the area of interest may stand out from the secondary area of the user interface (e.g., text from the article, not within the area of interest, may be blacked out). In an example, the user may provide feedback regarding the area of interest based upon the visual effect. For example, responsive to the area of interest being larger or smaller than intended by the user, the user may resize the area of interest. In this way, the user may confirm that the appropriate portion of the user interface is identified as the area of interest.

At 408, the area of interest may be evaluated to identify context associated with the area of interest. The context may be associated with the content displayed within the area of interest at the time the multi-touch gesture is performed. In an example, the context may be directed to a boarder scope than a particular word and/or phrase from the content within the area of interest. For example, the context may correspond to a plurality of related and/or seemingly unrelated aspects of the content within the area of interest, such as people, places, things, and/or information associated therewith (e.g., the context may correspond to a famous actress and charity work the famous actress has done in Hatti based a first portion of text within the area of interest corresponding to a new movie the famous actress has a leading role in and a second portion of text within the area of interest corresponding to other celebrities doing charity work in Hatti). In an example, the context may be identified by determining a link between a first aspect (e.g., a subject) and a second aspect (e.g., a second subject) of the area of interest. In this way, the context may provide a broad scope but not so broad as to include irrelevant/false context associated with unlinked aspects within the area of interest.

In an example, a keyword from the content within the area of interest may be identified. The keyword may be identified as a potential query search term. The keyword may be evaluated to determine a contextual meaning associated with the keyword. The contextual meaning may be identified based upon a relationship between the keyword and other keywords and/or phrases associated with the keyword within the area of interest (e.g., the contextual meaning may correspond to an inferred meaning for terms within the area of interest).

In an example, the area of interest may contain an image, such as an image of an individual playing baseball. The image may be evaluated to identify a first aspect, such as the identity of the individual, and a second aspect, such as the activity being performed in the image (e.g., baseball). The context may be identified based upon the first aspect of the image and the second aspect of the image. In an example, the aspects and/or context may be identified by utilizing image recognition techniques (e.g., facial recognition, text recognition, etc.), meta data recognition techniques, and/or the like.

In another example, the area of interest may contain all or a portion of an email message. The email message may be evaluated to identify context corresponding to a sender, a recipient, contact information for the sender or recipient, and/or keywords within the email message (e.g., keywords such as Presidential Debate may be identified as part of the context associated with the email message). For example, the context may comprise a location of the sender and keywords associated with an event (e.g., the location may be determined from an IP address associated with the sender and/or from an address book entry associated with the sender or recipient).

At 410, a search of content, based upon the context, may be performed to identify related content associated with the context. In an example, the search may utilize a search engine to search a content source (e.g., local area network, wide area network, local storage drive, etc.) for related content associated with the context. For example, the search engine may perform a Boolean-style syntax search, a semantic search, and/or the like to identify the related content from the content source.

In an example, the related content may comprise a news article, a user review (e.g., a product review, a restaurant review, a hotel review, etc.), an electronic dictionary definition, an electronic encyclopedia entry, a route to a destination (e.g., a route between a current location of the user and an event), a translation (e.g., a translation for a portion of text, such as a word or phrase), an internet search result (e.g., internet search results for a keyword identified from within the area of interest), a local network search result, a local device search result, an application (e.g., a baseball schedule application), and/or contact information.

In an example, the context may be utilized to expand or narrow an amount of related content identified by the search. For example, responsive to three related content items being identified by the search, the search may be expanded based upon the context, such as by including alternate names for keywords, including other optional keywords in the search parameters, and/or making required keywords optional (e.g., a search for context comprising keywords "mayor", "Ohio", and "scandal" may be expanded by including optional keywords "leader", "Columbus" "embezzlement", based upon the context). In another example, responsive to three hundred related content items being identified by the search, the search may be narrowed based upon the context, such as by including other required keywords in the search parameters (e.g., the search may be narrowed by requiring all of the keywords "mayor", "Ohio", "Columbus", and "scandal" based upon the context being indicative of the mayor being from Columbus, Ohio).

In an example, the search of the content may be performed based upon a user interest associated with the context. The user interest may be identified from a user profile associated with the user. In an example, responsive to the context being associated with an international soccer tournament and the user indicating a user interest in a Brazilian soccer team on a social media user profile, the related content may be identified, filtered, and/or ranked based upon the context and the user interest (e.g., content not associated with the Brazilian soccer team may be filtered out of the search results).

At 412, the related content may be provided through the client device. In an example, the related content may be provided as a set of search results corresponding to the related content. The set of search results may comprise links to the related content (e.g., links to websites, links to command prompts to launch applications, etc.). In an example, the set of search results may be displayed through a second user interface, such as a search assistant user interface. The search results displayed by the second user interface may provide a preview of the related content. In this way, the user may obtain desired information from the search results (e.g., the user may obtain a definition for a word from the preview for a dictionary webpage). In an example, responsive to the user selecting a particular related content item from the search results, the particular content item may be displayed by a third user interface (e.g., responsive to the particular content item being a weather report, a weather application may be launched to display the weather report). In yet another example, responsive to the user viewing the search results in the second user interface and performing a pinch-out gesture, the second user interface may be transitioned back to the user interface. In yet another example, the related content may be provided through a pop-up notification overlaid over the user interface. The pop-up notification may display previews of the search results for the related content.

Responsive to providing the related content items to the user, such as in the form of search results, a secondary input may be received from the user. In an example, the secondary input and the context may be utilized to perform a second search. In this way, the secondary input may be utilized to expand and/or filter (e.g., narrow) the search results for the related content items. In an example, the search results may be expanded and/or filtered based upon a potentially relevant keyword. A set of potentially relevant keywords, associated with the context, may be provided to the user. Responsive to the user selecting a first potentially relevant keyword from the set of potentially relevant keywords, the first potentially relevant keyword may be utilized as the secondary input. In an example, the related content items may be filtered based upon the secondary input to obtain a set of filtered related content items (e.g., the keyword may be added to a search query as an "AND" connected word). The set of filtered related content items may be provided to the user. In this way, the number of related content items displayed to the user may be reduced based upon the secondary input.

In another example, a text input box may be displayed to the user through the second user interface. The user may be prompted to enter a keyword and/or phrase into the text input box displayed through the second user interface. Responsive to the keyword and/or phrase being entered into the text input box, the keyword and/or phrase may be utilized as the secondary input. For example, the keyword and/or phrase entered into the text input box may be utilized to expand the search results (e.g., the keyword may be added to a search query as an "OR" connected word)

In an example, the use of multi-touch gestures (e.g., pinch gestures) may provide a greater level of selectivity than single point gestures (e.g., a tap gesture may return search results that are not directed to desired content based upon too large or too small of an area being evaluated) and/or a great level of efficiency that swipe gestures (e.g., a swipe gesture utilized to draw a circle/square around an area of interest may take longer to perform than a pinch gesture, thus reducing user experience with an interface).

At 414, the method 400 ends.

Figure 5:
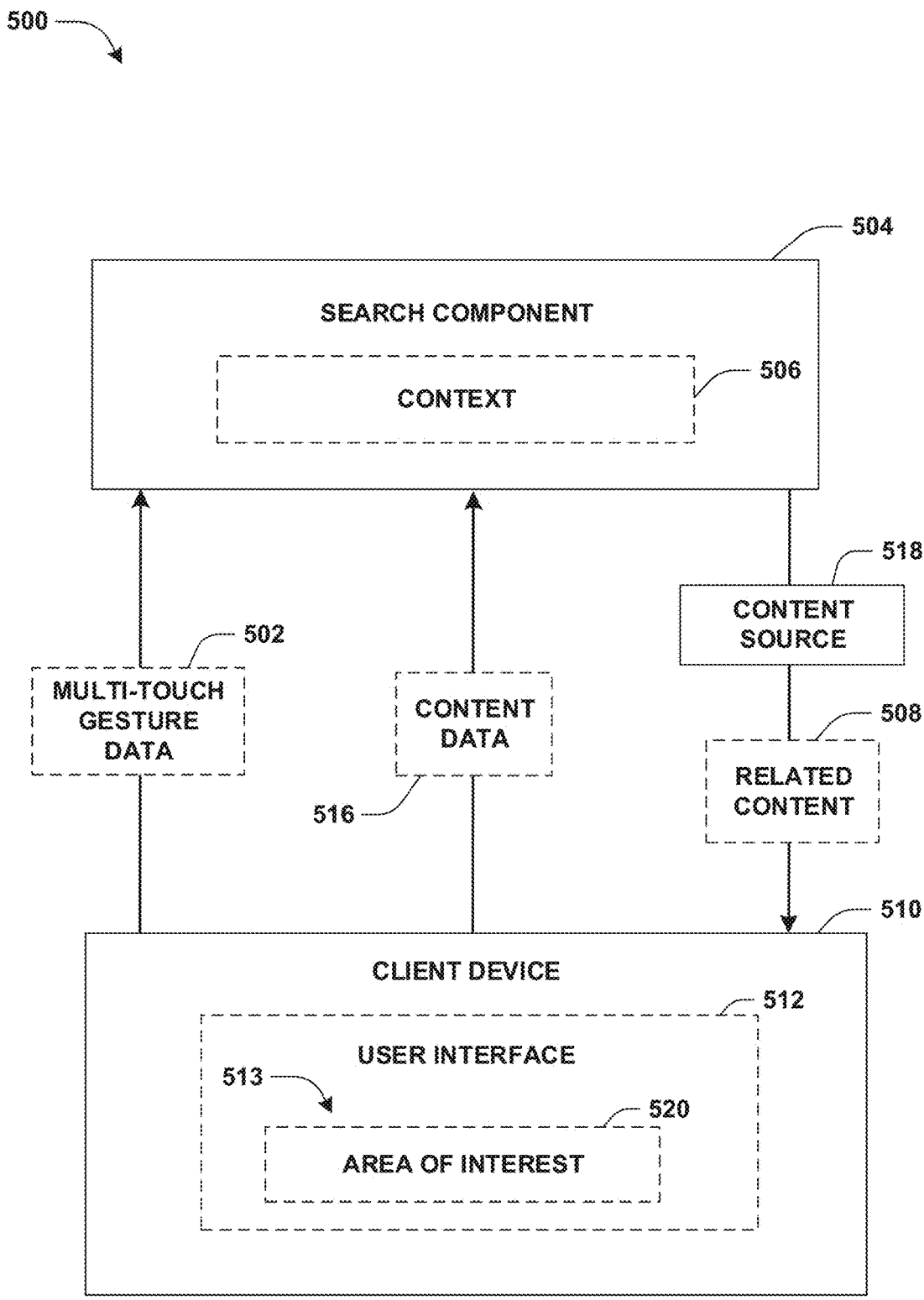
FIG. 5 is a component block diagram illustrating an example system for providing related content associated with a multi-touch gesture to a user, wherein the related content is provided through a client device.

FIG. 5 illustrates an example of a system 500, where a search component 504 is configured to provide related content 508 associated with a multi-touch gesture 513 to a user through a client device 510. In an example, the search component 504 may be configured to receive multi-touch gesture data 502 corresponding to a multi-touch gesture 513 performed on the client device 510. The search component 504 may be configured to evaluate the multi-touch gesture data 502 to identify an area of interest 520 of a user interface 512 displayed by the client device 510. The area of interest 520 may be evaluated to identify context 506 associated with the area of interest 520 (e.g., a name of a movie). In an example, content data 516, corresponding to content being displayed within the area of interest 520, may be evaluated to determine the context 506 (e.g., an article about the movie). The search component 504 may be configured to perform a search of content within a content source 518 based upon the context 506 to identify related content 508 associated with the context 506 (e.g., user reviews for the movie). The related content 508 may be provided to the user through the client device 510.

Figure 6A:
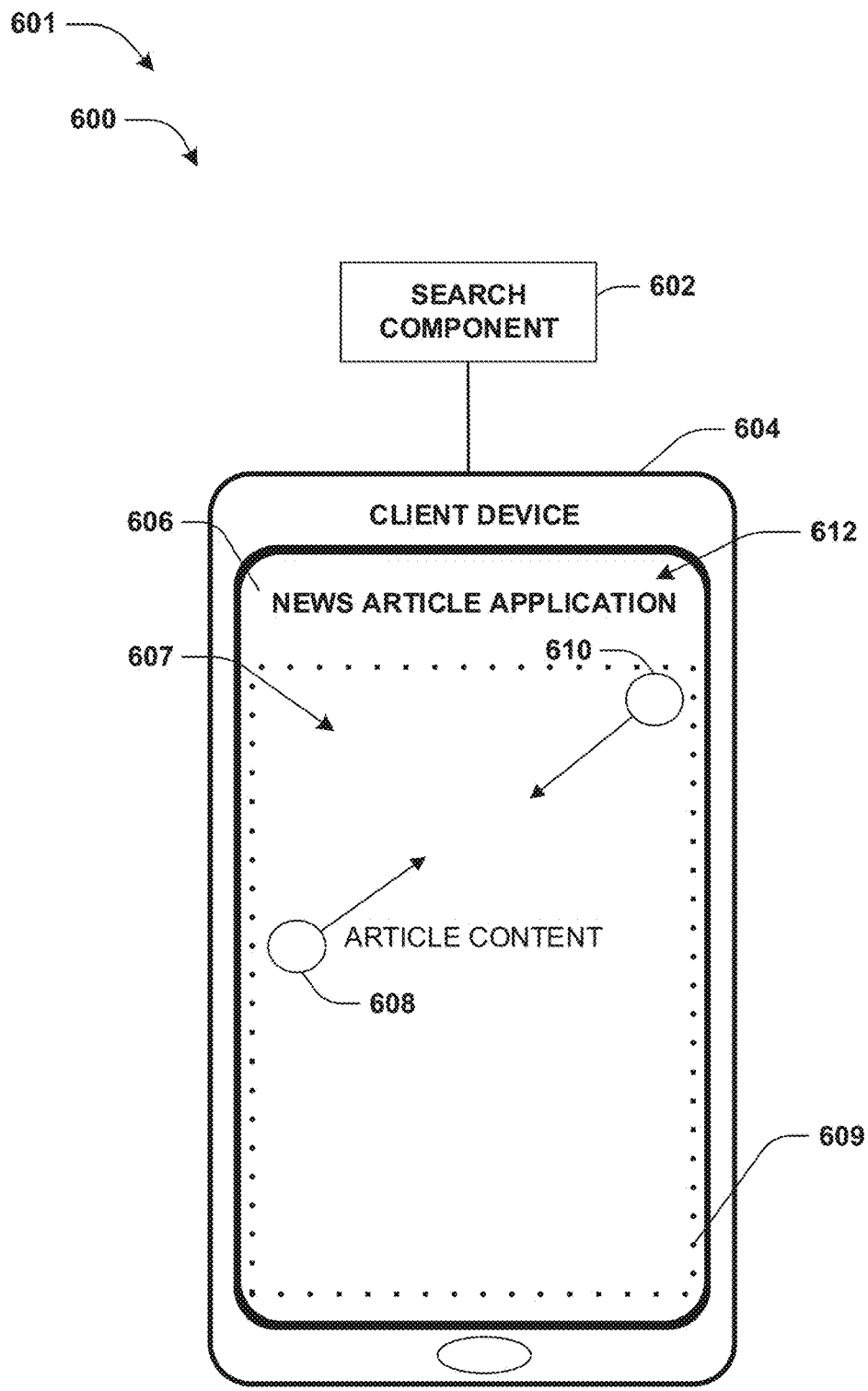
FIG. 6A is a component block diagram illustrating an example system for providing related content associated with a multi-touch gesture to a user, wherein a pinch-in multi-touch gesture is performed.

FIGS. 6A-6E illustrate examples of the system 600, where a search component 602 is configured to provide related content, associated with a multi-touch gesture 607, to a user. A client device 604, comprising a touch screen display 606, may provide the related content 634 to the user. FIG. 6A illustrates an example 601 where a pinch-in gesture 607 is received through a news article application user interface 612. The news article application user interface 612 may comprise article content 609 (e.g., text and/or pictures within the news article). The pinch-in gesture 607 may comprise a first finger gesture 608 and a second finger gesture 610.

Figure 6B:
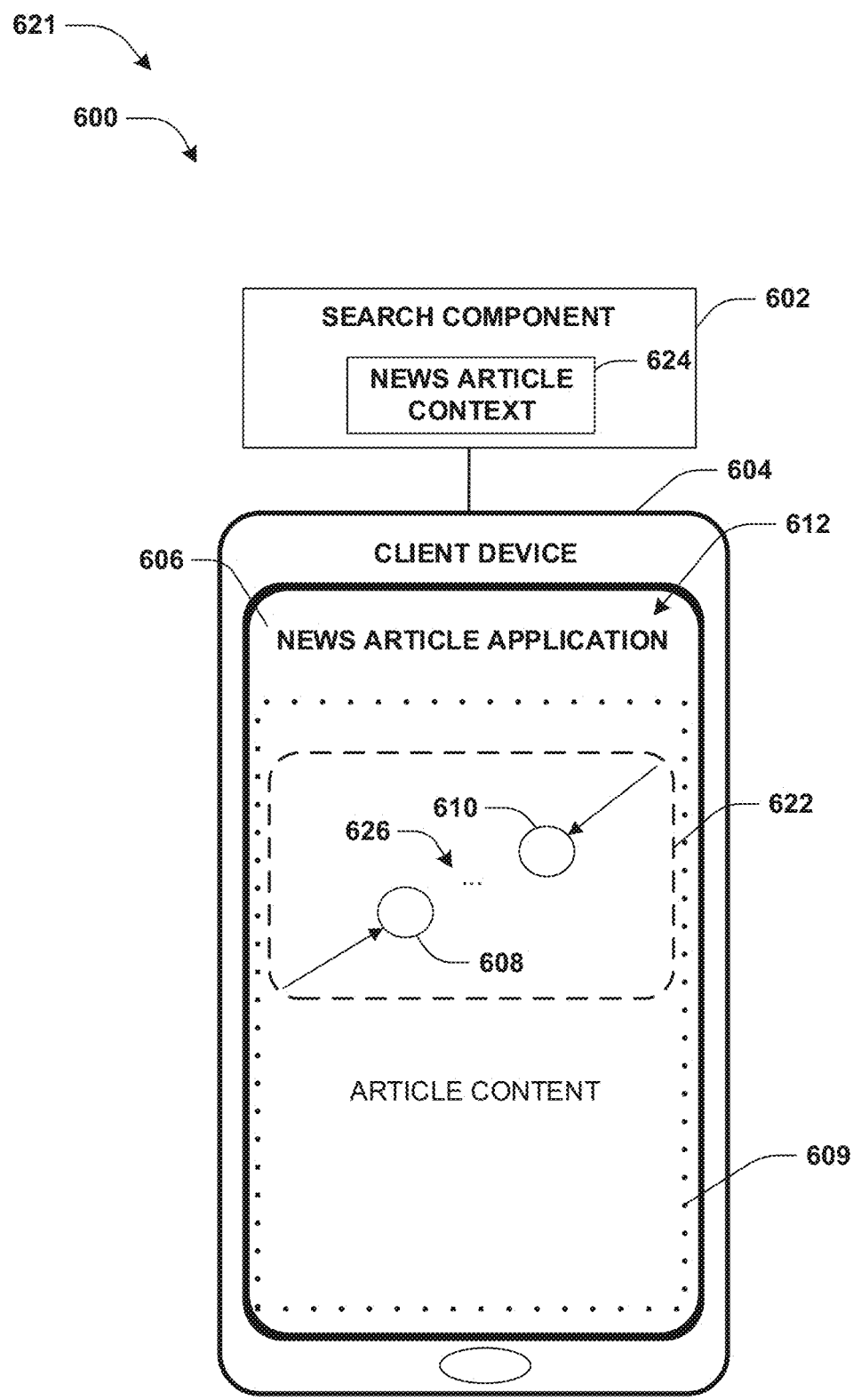
FIG. 6B is a component block diagram illustrating an example system for providing related content associated with a multi-touch gesture to a user, wherein an area of interest is identified.

FIG. 6B illustrates an example 621 of the system 600 where the search component 602 is configured to identify an area of interest 622 of the news article application user interface 612. In an example, the first finger gesture 608 and the second finger gesture 610 may be evaluated to identify the area of interest 622. The area of interest 622 may comprise a portion 626 of the article content 609, such as a paragraph, a set of sentences, a phrase, a word, an image, or the like. The portion 626 of the article content 609 within the area of interest 622 may be evaluated by the search component 602 to identify a news article context 624 about concerts based upon the portion 626 of the article content 608 being identified as corresponding to a news article about a concert.

Figure 6C:
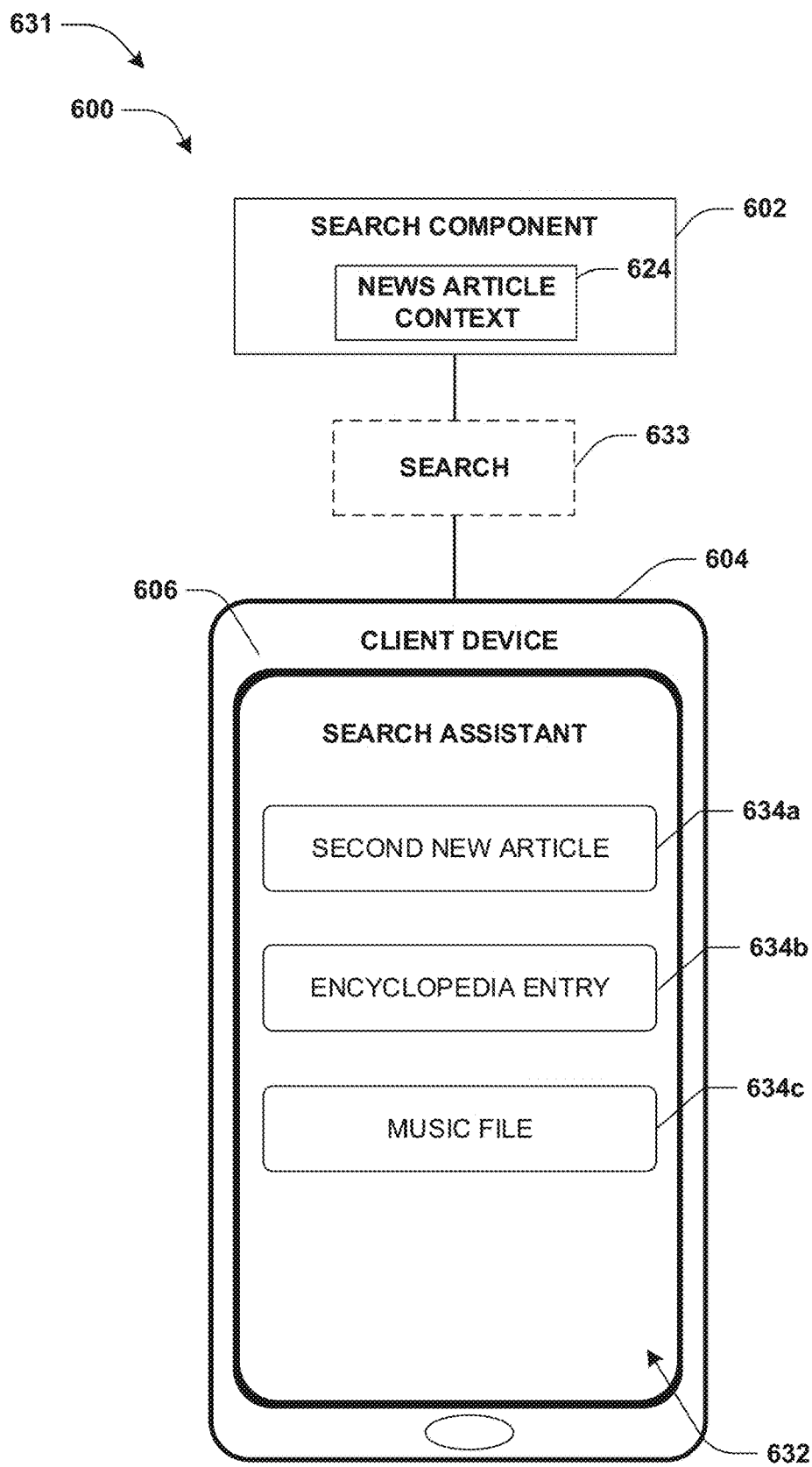
FIG. 6C is a component block diagram illustrating an example system for providing related content associated with a multi-touch gesture to a user, wherein related content is provided through a second user interface.

FIG. 6C illustrates an example 631 of the system 600 where the search component 602 is configured to perform a search 633 to identify related content associated with the news article context 624 of concerts, such as a second news article related content item 634a about concerts, an encyclopedia entry related content item 634b about concerts, and a music file related content item 634c (e.g., a link to a music file) of a concert, based upon the news article context 624. In an example, responsive to performing the search 633, a search assistant user interface 632 may be displayed on the touchscreen display 606 of the client device 604. The search assistant user interface 632 may be configured to display the related content 634a-634c to the user. In this way, the search component 602 may perform in-application searches for related content associated with context identified based upon a multi-touch gesture.

Figure 6D:
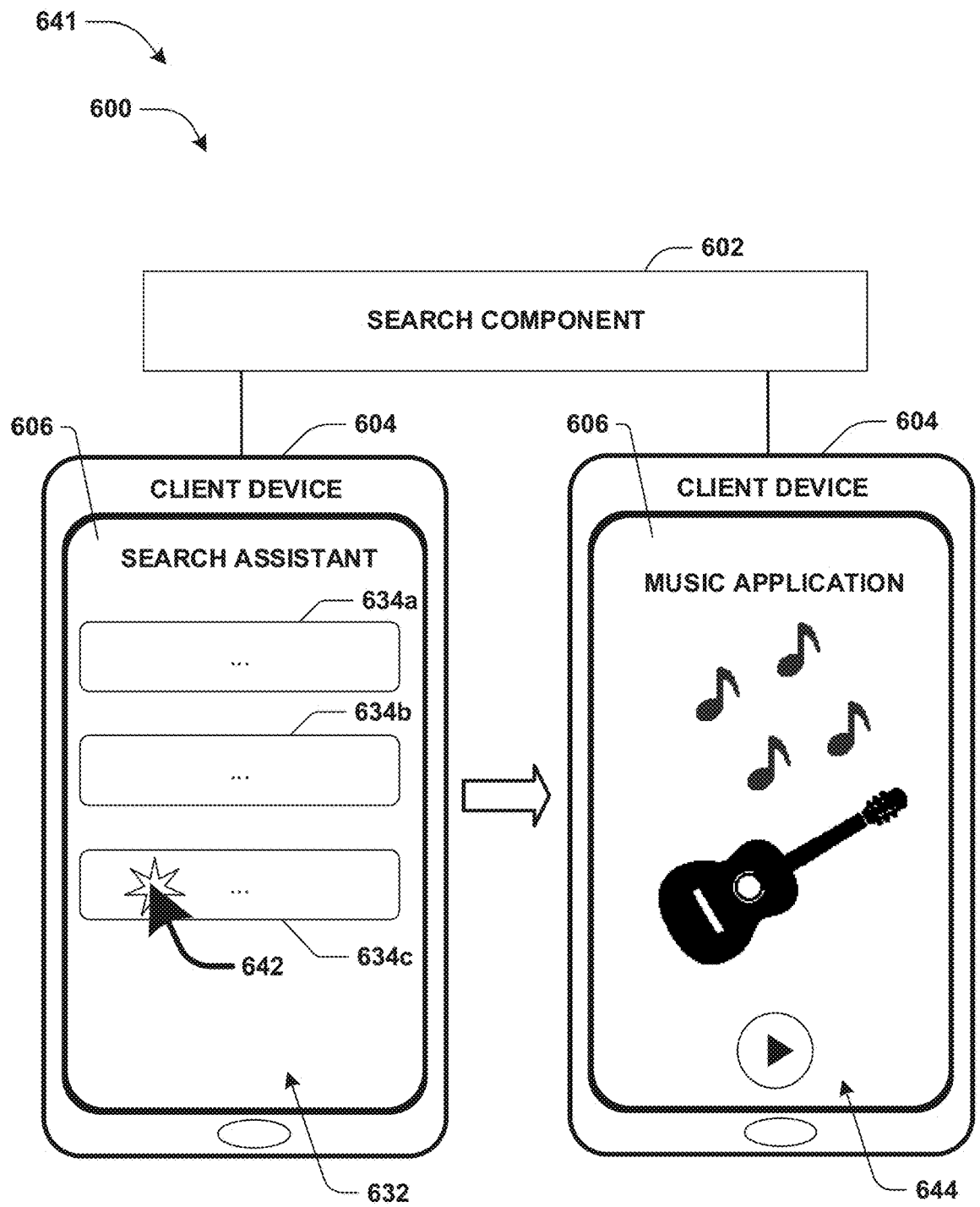
FIG. 6D is a component block diagram illustrating an example system for providing related content associated with a multi-touch gesture to a user, wherein a third user interface is provided in response to a user selection of a related content item.

FIG. 6D illustrates an example 641 of the system 600 where the search component 602 is configured to launch and/or display a music application user interface 644 in response to receiving a selection action 642 associated with the music file related content item 634c from the user. In an example, the music application user interface 644 may be configured to play the music file related content item 634c in response to the user performing the selection action 642.

Figure 6E:
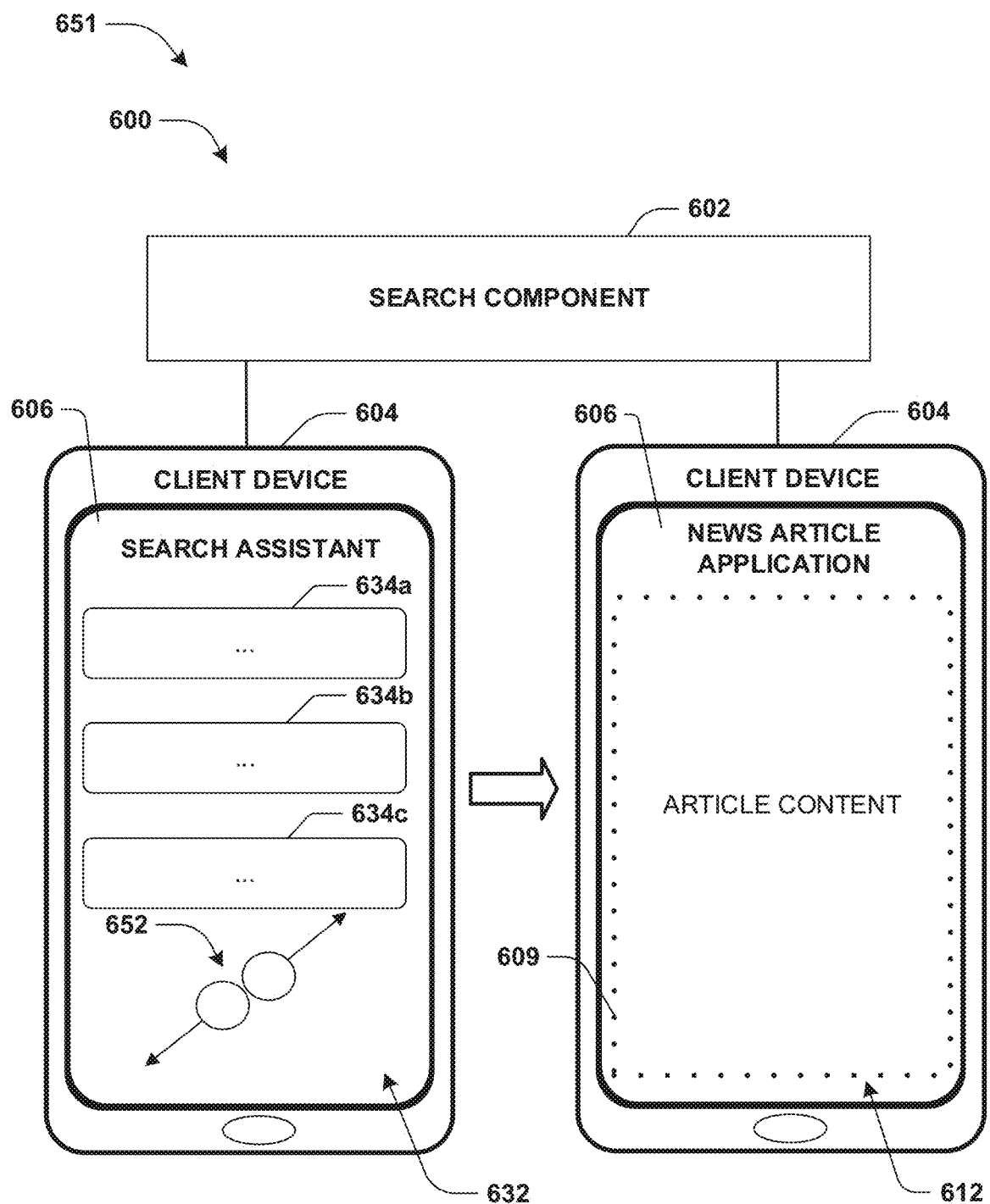
FIG. 6E is a component block diagram illustrating an example system for providing related content associated with a multi-touch gesture to a user, wherein responsive to receiving a pinch-out gesture, a second user interface transitions into a first user interface.

FIG. 6E illustrates an example 651 of the system 600 where the search component 602 is configured to return to the news article application user interface 612. In an example, a pinch-out gesture 652 may be received by the search component 602. Responsive to the search component 602 receiving the pinch-out gesture 652, the client device 604 may transition from displaying the search assistant user interface 632 to displaying the news article application user interface 612. In this way, the user may efficiently view the related content, such as related content items 634a-634c and subsequently transition back to the news article application user interface 612 (e.g., the user interface that the user was originally viewing).

Figure 7A:
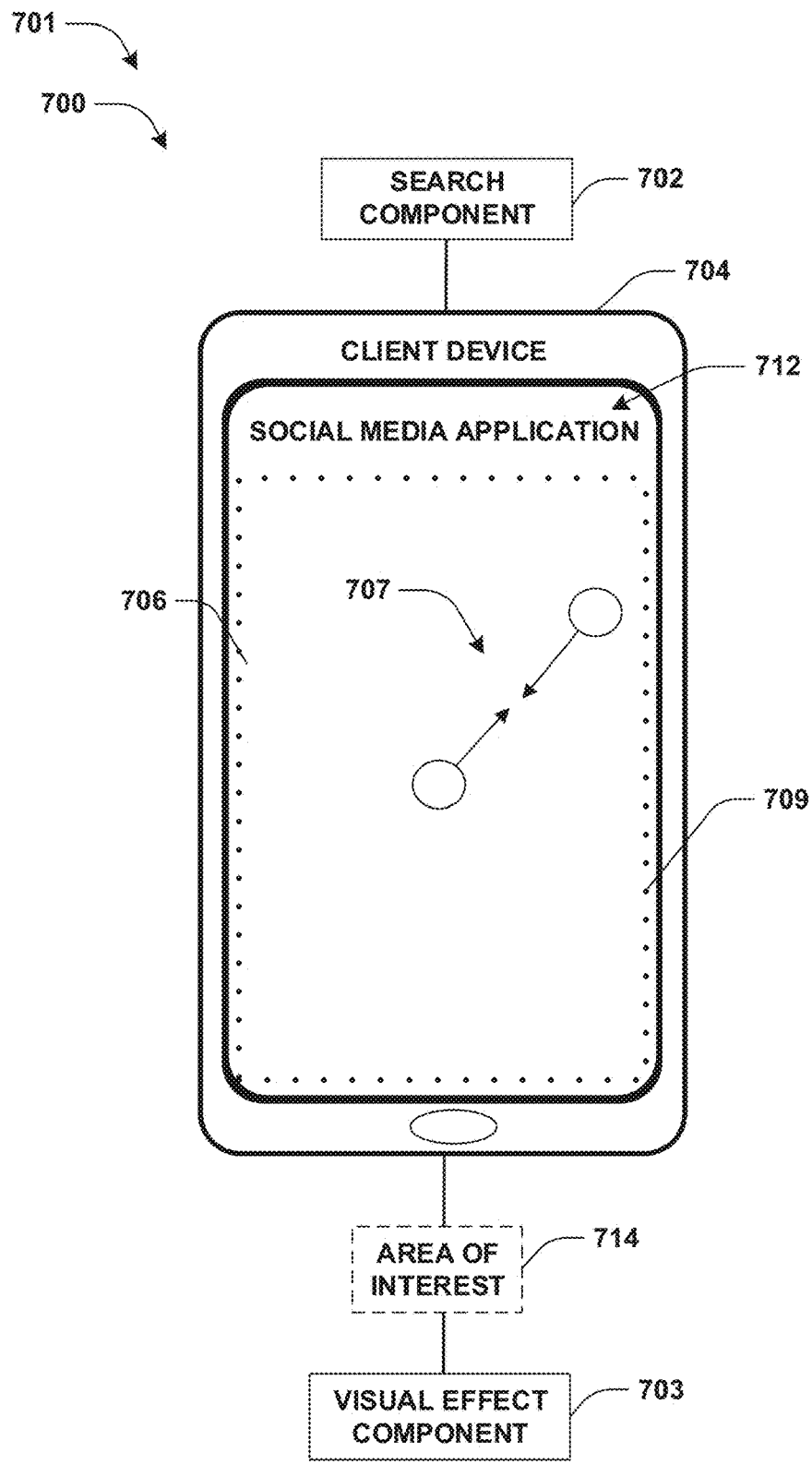
FIG. 7A is a component block diagram illustrating an example system for providing related content associated with a multi-touch gesture to a user, wherein a pinch-in gesture is received.

FIGS. 7A-7D illustrate examples of a system 700 where a visual effect component 703 is configured to provide a visual effect 722 based upon the identification of an area of interest 714 by a search component 702. In an example, a social media application user interface 712 may be projected on a display 706 of a client device 704. FIG. 7A illustrates an example 701 where a pinch-in gesture 707, received through the display 706, is evaluated by a search component 702 to identify an area of interest 714. Responsive to the area of interest 714 being identified, the area of interest 714 may be provided to the visual effect component 703.

Figure 7B:
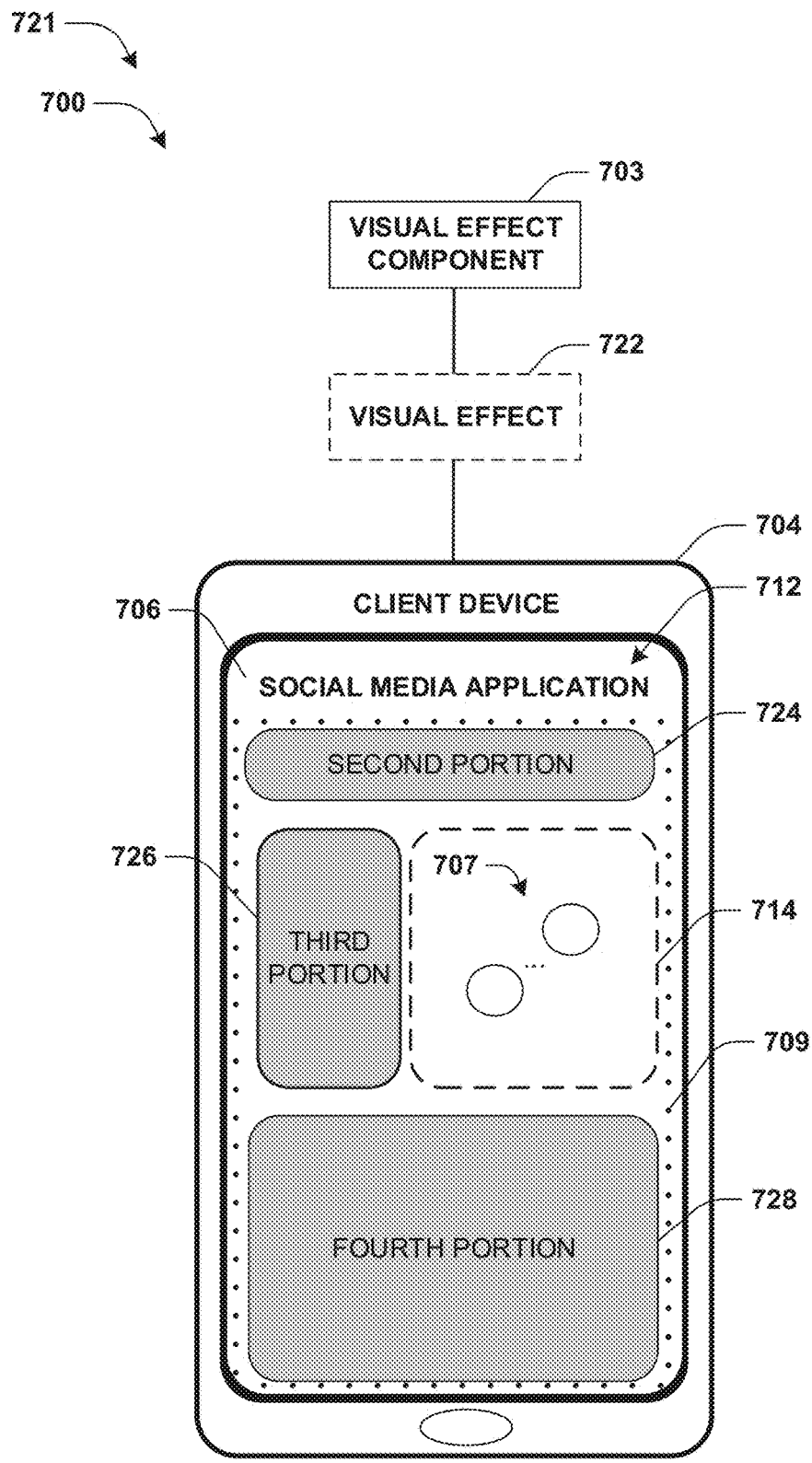
FIG. 7B is a component block diagram illustrating an example system for providing related content associated with a multi-touch gesture to a user, wherein a visual effect is applied to a first user interface.

FIG. 7B illustrates an example 721 where the visual effect component 702 is configured to display a visual effect 722. The visual effect 722 may be configured to provide a visual identification for the area of interest 714. For example, the visual effect 722 may distort a second portion 724, a third portion 726, and/or a fourth portion 728 of the social media application user interface 712 but not the area of interest 714. In this way, the area of interest 714 and content contained therein may be easily identified and/or viewed by a user. In an example, the visual effect 722 may be provided in response to the user performing the pinch-in gesture 707 and subsequently maintaining contact with the display 706. For example, the visual effect 722 may be provided until fingers utilized to perform the pinch-in gesture 707 are removed (e.g., lifted off) the display 706. In this way, the area of interest 707 corresponding to the pinch-in gesture 707 may be visually displayed to the user, such that the user may confirm the portion of the social media application user interface 712 corresponding to the area of interest 707. In an example, responsive to the user removing the fingers utilized to perform the pinch-in gesture 707 from the display 706, a search may be performed.

Figure 7C:
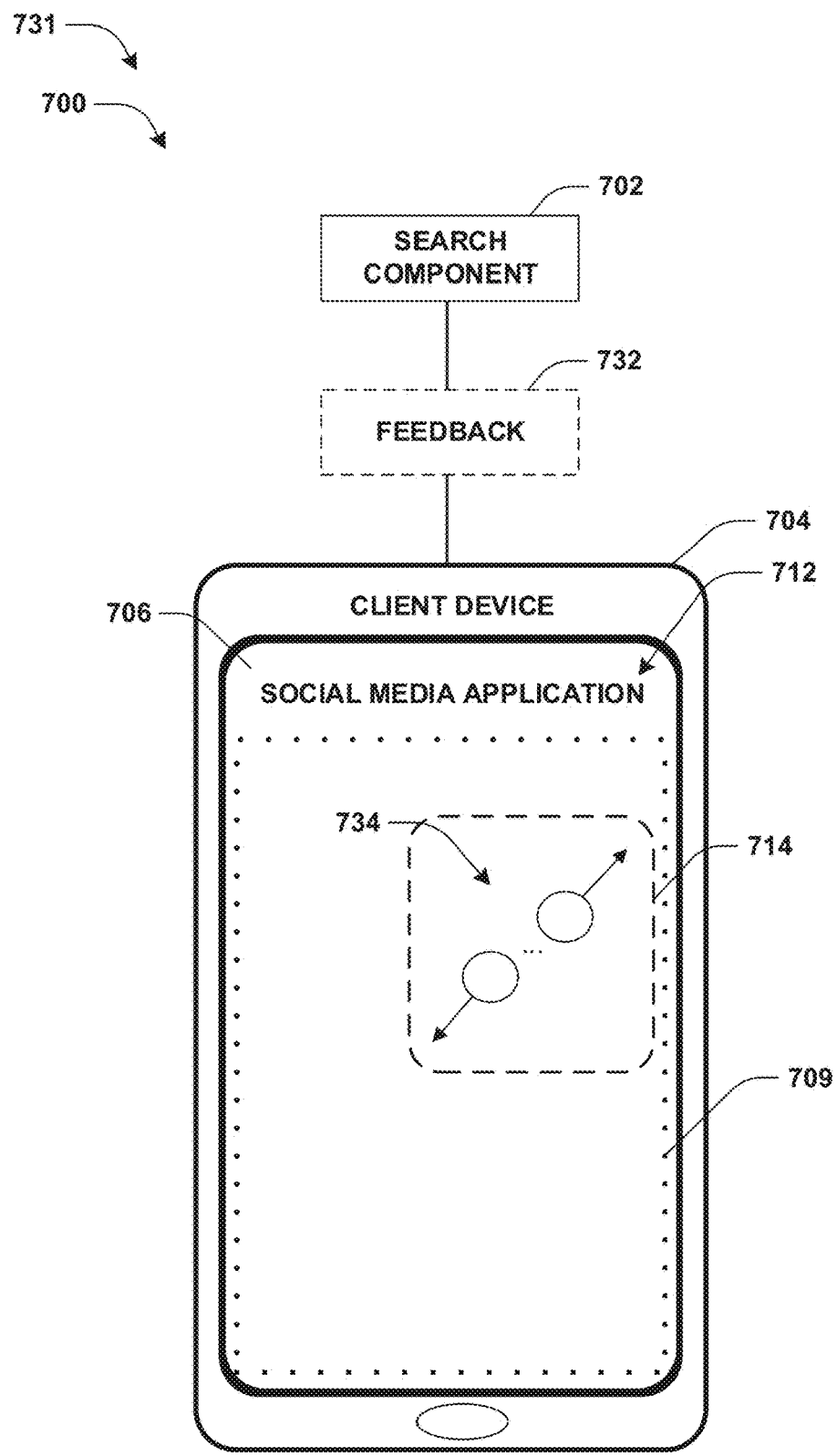
FIG. 7C is a component block diagram illustrating an example system for providing related content associated with a multi-touch gesture to a user, wherein feedback is provided.

FIG. 7C illustrates an example 731 wherein feedback 732 is received from the user. The feedback 732 may be indicative of a size, shape, and/or location of the area of interest 714. Responsive to the of the area of interest 714 not corresponding to an intended area of interest, a pinch-out gesture 734 may be provided as the feedback 732. Responsive to receiving the pinch-out gesture 734, the search component 702 may not perform a search based upon context associated with the area of interest 714. In this way, computing resources may be reduced by minimizing irrelevant and/or unwanted searches performed based upon context being identified from unintended areas of interest.

Figure 7D:
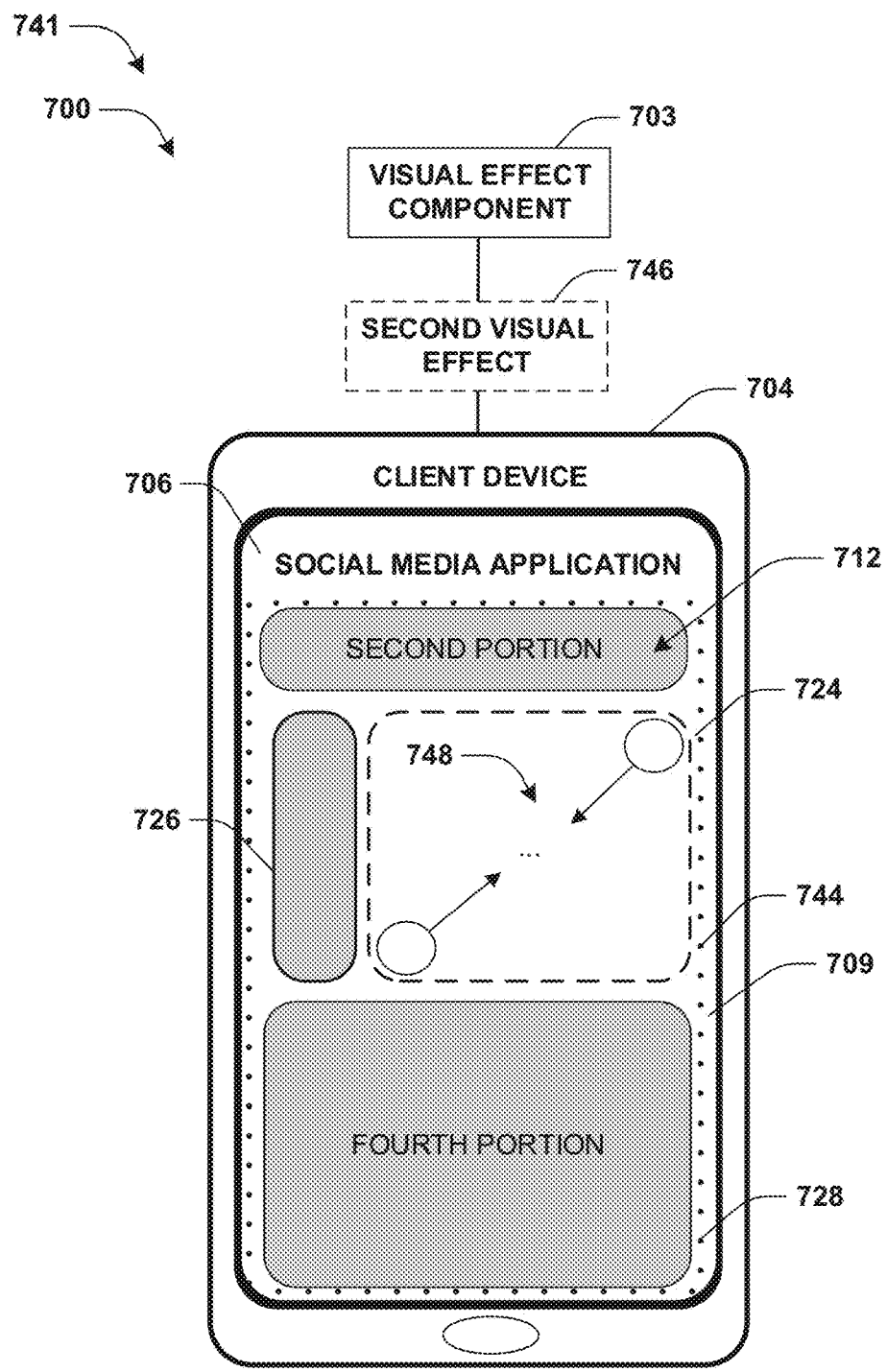
FIG. 7D is a component block diagram illustrating an example system for providing related content associated with a multi-touch gesture to a user, wherein a second visual effect is provided in response to adjusting an area of interest.

FIG. 7D illustrates an example 741 where the visual effect component 703 is configured to provide a second visual effect 746. The second visual effect 746 may be provided in response to a second area of interest 744 being identified based upon a second pinch-in gesture 748. In an example, the second area of interest 744 may encompass additional content (e.g., a larger area) displayed by the social media application user interface 712. In an example, the user may remove the finger used to perform the second pinch-in gesture 748, and thus a search may be performed based upon context associated with the second area of interest 744.

Figure 8:
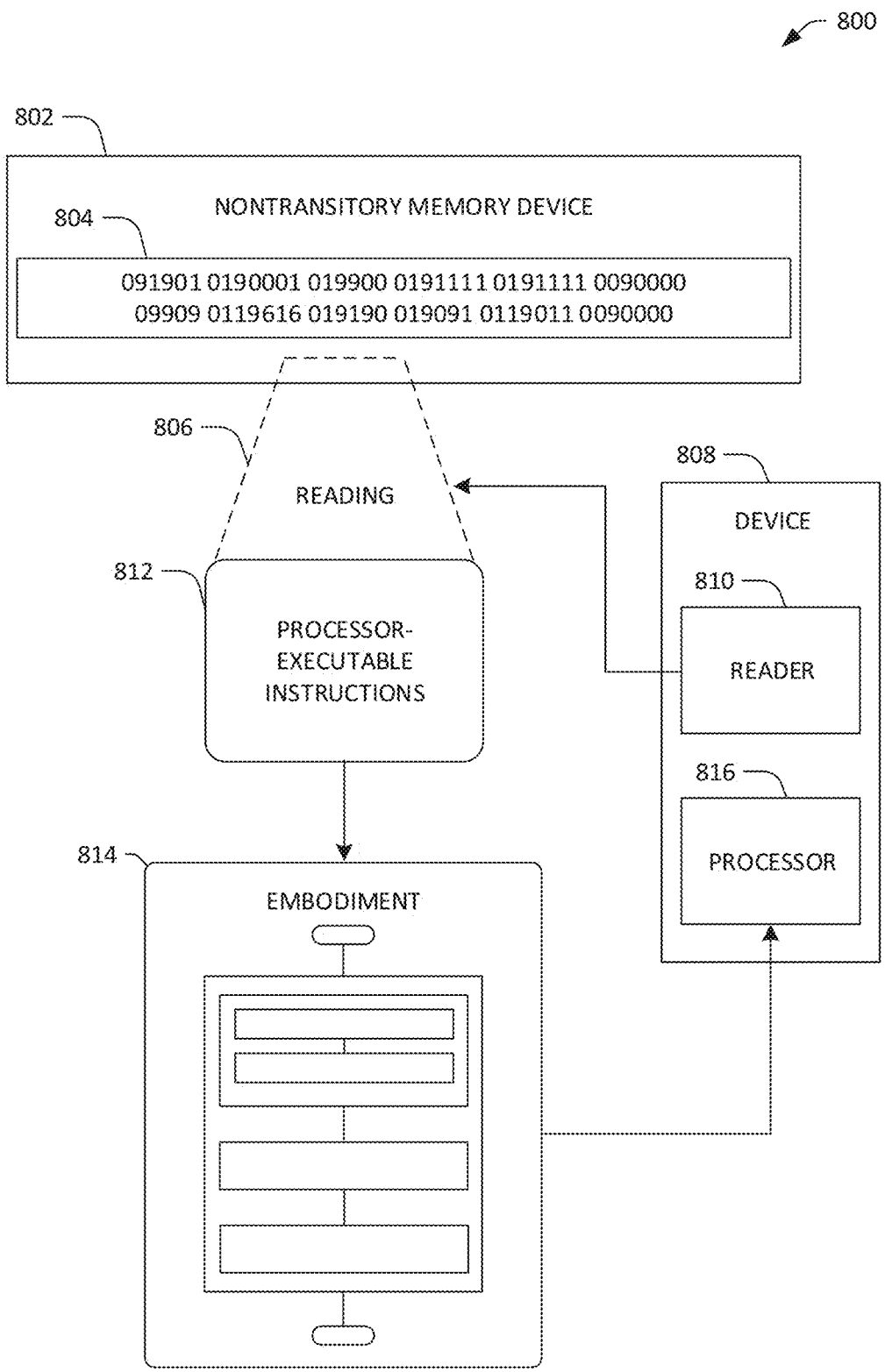
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4, for example. In some embodiments, the processor-executable instructions, when executed on the processor 816 of the device 808, are configured to implement a system, such as at least some of the example system 500 of FIG. 5, at least some of the example system 600 of FIGS. 6A-6E, and/or at least some of the example system 700 of FIGS. 7A-7D, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a"

and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
utilizing a visual effect to indicate an area of interest of a user interface of a client device, wherein utilizing the visual effect comprises distorting a secondary area, of the user interface, not included in the area of interest but not distorting the area of interest;
evaluating the area of interest, wherein the area of interest comprises an image of an entity performing an activity, wherein the evaluating comprises (i) evaluating the image, utilizing facial recognition, to identify an identity of the entity in the image and (ii) evaluating the image, utilizing image recognition, to identify the activity being performed in the image by the entity in the image;
identifying context associated with the area of interest based upon a link between the identity of the entity and the activity being performed by the entity, wherein the context is based upon the image;
performing a search of content based upon the context to identify a first set of search results;
at least one of:
responsive to determining that the first set of search results comprises less than a first threshold number of search results:
expanding the search by at least one of adding one or more optional keywords to search parameters or making one or more required keywords in the search parameters optional; and
determining a second set of search results based upon the expanding; or
responsive to determining that the first set of search results comprises more than a second threshold number of search results:
narrowing the search by adding one or more required keywords to the search parameters; and
determining the second set of search results based upon the narrowing;
identifying a plurality of potential query search terms, comprising a first potential query search term and a second potential query search term, based upon the context;
providing the second set of search results and the plurality of potential query search terms through the client device;
responsive to receiving a selection of the first potential query search term of the plurality of potential query search terms, filtering the second set of search results based upon the first potential query search term to generate a filtered set of search results; and
providing the filtered set of search results through the client device.

2. The method of claim 1, wherein the distorting the secondary area comprises at least one of fading the secondary area, dimming the secondary area, blurring the secondary area or blacking out the secondary area.

3. The method of claim 1, comprising:
receiving feedback associated with identification of the area of interest based upon the visual effect; and
responsive to the feedback indicating an improper identification for the area of interest, adjusting the area of interest and utilizing the visual effect to indicate the adjusted area of interest by distorting a first portion of the secondary area of the user interface but not distorting a second portion of the secondary area of the user interface, wherein the first portion of the secondary area is not included in the adjusted area of interest but the second portion of the secondary area is included in the adjusted area of interest.

4. The method of claim 1, comprising:
providing a second user interface comprising search results corresponding to related content; and responsive to a user selecting a search result for a related content item, displaying a third user interface comprising the related content item.

5. The method of claim 1, the identifying the context based upon a location of a sender of a message.

6. The method of claim 5, the location of the sender of the message determined based upon an IP address associated with the sender.

7. The method of claim 1, the filtering the second set of search results comprising:
adding the first potential query search term to a search query associated with the second set of search results.

8. The method of claim 1, the filtered set of search results comprising a local network search result.

9. The method of claim 1, comprising:
defining the area of interest based upon one or more multi-touch hands-off gestures detected, via at least one of a sensor or a range camera, in association with a projection of the user interface via a projector.

10. The method of claim 1, comprising:
responsive to determining that the first set of search results comprises less than the first threshold number of search results:
expanding the search by adding the one or more optional keywords to the search parameters of the first set of search results; and
determining the second set of search results based upon the expanding.

11. The method of claim 1, comprising:
responsive to determining that the first set of search results comprises less than the first threshold number of search results:
expanding the search by making the one or more required keywords in the search parameters of the first set of search results optional; and
determining the second set of search results based upon the expanding.

12. The method of claim 1, comprising:
performing a search based upon a user interest associated with the context to identify related content associated with the user interest.

13. The method of claim 1, comprising:
responsive to determining that the first set of search results comprises more than the second threshold number of search results:
narrowing the search by adding the one or more required keywords to the search parameters; and
determining the second set of search results based upon the narrowing.

14. The method of claim 5, the location of the sender of the message determined based upon an address book entry associated with at least one of the sender or a recipient of the message.

15. A system, comprising:
a processor; and
memory comprising processor-executable instructions that when executed by the processor cause the processor to implement a search component configured to:
utilize a visual effect to indicate an area of interest of a user interface of a client device, wherein utilizing the visual effect comprises distorting a secondary area, of the user interface, not included in the area of interest but not distorting the area of interest;
evaluate the area of interest of a first user interface of a client device, wherein the area of interest comprises an image of an entity performing an activity, wherein the evaluating comprises evaluating the image, utilizing image recognition, to identify the activity being performed in the image;
identify context associated with the area of interest based upon a link between an identity of the entity and the activity being performed by the entity, wherein the context is based upon the image;
perform a search of content based upon the context to identify a first set of search results;
at least one of:
responsive to determining that the first set of search results comprises less than a first threshold number of search results:
expanding the search by at least one of adding one or more optional keywords to search parameters or making one or more required keywords in the search parameters optional; and
determining a second set of search results based upon the expanding; or
responsive to determining that the first set of search results comprises more than a second threshold number of search results:
narrowing the search by adding one or more required keywords to the search parameters; and
determining the second set of search results based upon the narrowing;
identify a plurality of potential query search terms, comprising a first potential query search term and a second potential query search term, based upon the context;
provide the second set of search results and the plurality of potential query search terms through a second user interface of the client device;
responsive to receiving a selection of the first potential query search term of the plurality of potential query search terms, filter the second set of search results based upon the first potential query search term to generate a filtered set of search results; and
provide the filtered set of search results through the second user interface of the client device.

16. The system of claim 15, wherein the distorting the secondary area comprises at least one of fading the secondary area, dimming the secondary area, blurring the secondary area or blacking out the secondary area.

17. The system of claim 15, the processor-executable instructions, when executed by the processor, causing the processor to implement a visualization component configured to:
receive feedback associated with the identification of the area of interest based upon the visual effect provided; and
responsive to the feedback indicating an improper identification for the area of interest, provide a second visual effect in response to an adjustment to the area of interest.

18. The system of claim 15, the search component configured to:
add the first potential query search term to a search query associated with the second set of search results.

19. The system of claim 15, the search component configured to:
display a text input box through the second user interface;
prompt a user to enter at least one of a keyword or a phrase associated with the context into the text input box; and
utilize at least one of the keyword or the phrase as a secondary input to perform a second search.

20. A non-transitory computer readable medium comprising computer executable instructions that when executed by a processor perform a method, comprising:
- utilizing a visual effect to indicate an area of interest of a user interface of a client device, wherein utilizing the visual effect comprises distorting a secondary area, of the user interface, not included in the area of interest but not distorting the area of interest;
- receiving feedback associated with identification of the area of interest based upon the visual effect;
- responsive to the feedback indicating an improper identification for the area of interest, adjusting the area of interest and utilizing the visual effect to indicate the adjusted area of interest by distorting a first portion of the secondary area of the user interface but not distorting a second portion of the secondary area of the user interface, wherein the first portion of the secondary area is not included in the adjusted area of interest but the second portion of the secondary area is included in the adjusted area of interest;
- evaluating the adjusted area of interest, wherein the adjusted area of interest comprises an image of an entity performing an activity, wherein the evaluating comprises (i) evaluating the image to identify an identity of the entity in the image and (ii) evaluating the image, utilizing image recognition, to identify the activity being performed in the image by the entity in the image;
- identifying context associated with the adjusted area of interest based upon a link between the identity of the entity and the activity being performed by the entity, wherein the context is based upon the image;
- performing a search of content based upon the context to identify a first set of search results;
- at least one of:
  - responsive to determining that the first set of search results comprises less than a first threshold number of search results:
    - expanding the search by at least one of adding one or more optional keywords to search parameters or making one or more required keywords in the search parameters optional; and
    - determining a second set of search results based upon the expanding; or
  - responsive to determining that the first set of search results comprises more than a second threshold number of search results:
    - narrowing the search by adding one or more required keywords to the search parameters; and
    - determining the second set of search results based upon the narrowing;
- identifying a plurality of potential query search terms, comprising a first potential query search term and a second potential query search term, based upon the context;
- providing the second set of search results and the plurality of potential query search terms through a second user interface;
- responsive to receiving a selection of the first potential query search term of the plurality of potential query search terms, filtering the second set of search results based upon the first potential query search term to generate a filtered set of search results; and
- providing the filtered set of search results.

* * * * *